June 3, 1930.                D. S. BARROWS                 1,761,171
                                DRAFT RIGGING
                          Filed June 15, 1926           3 Sheets-Sheet 2
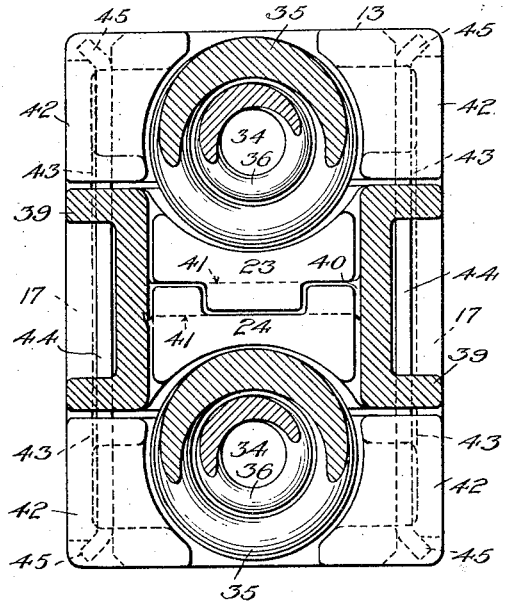
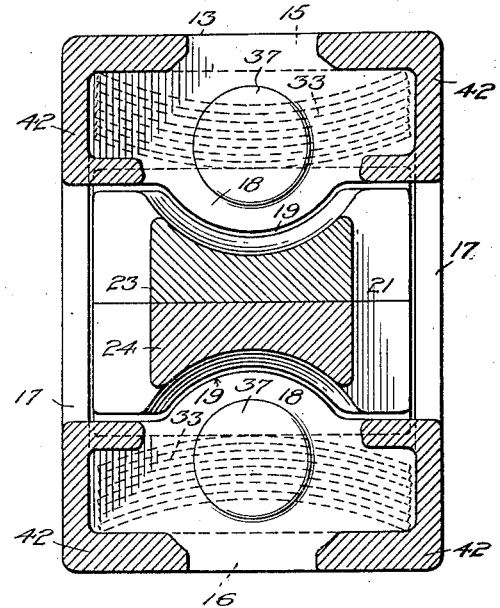
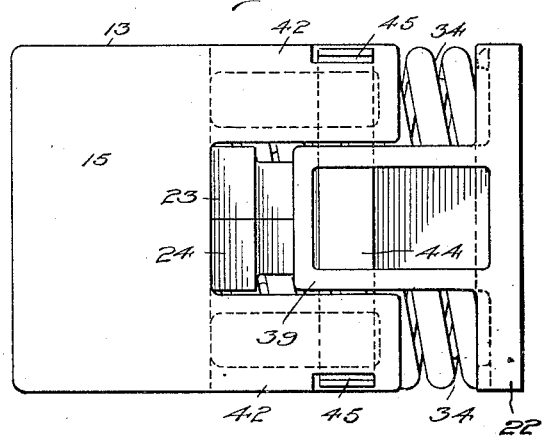
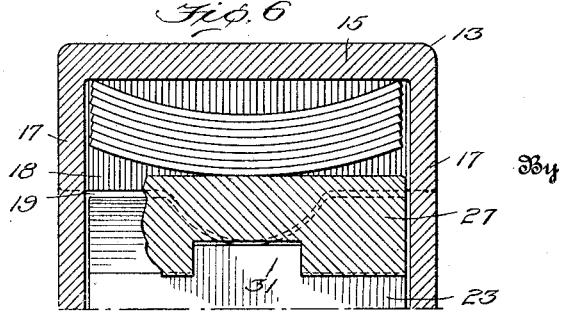

June 3, 1930.  D. S. BARROWS  1,761,171
DRAFT RIGGING
Filed June 15, 1926   3 Sheets-Sheet 3
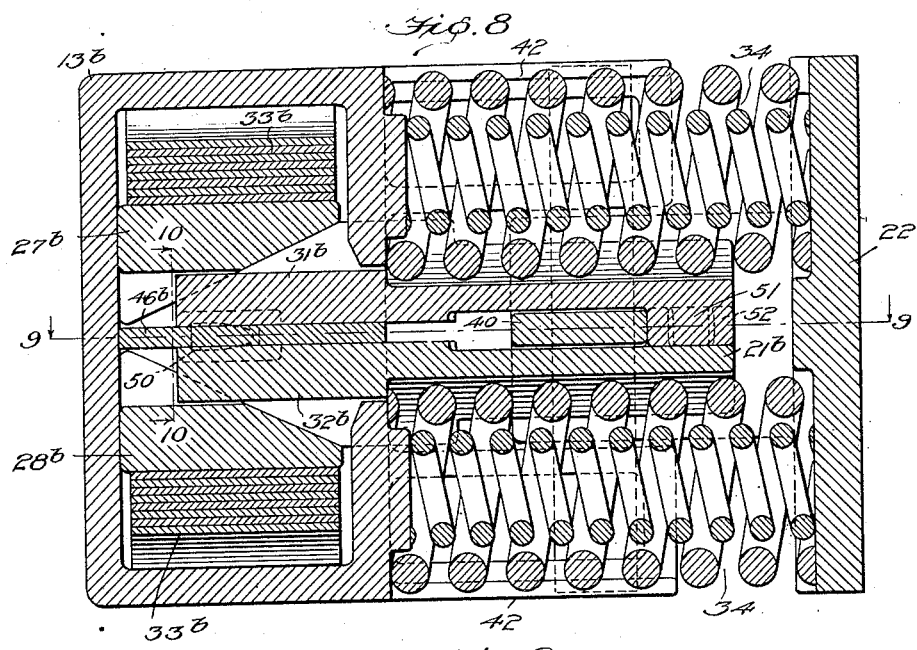
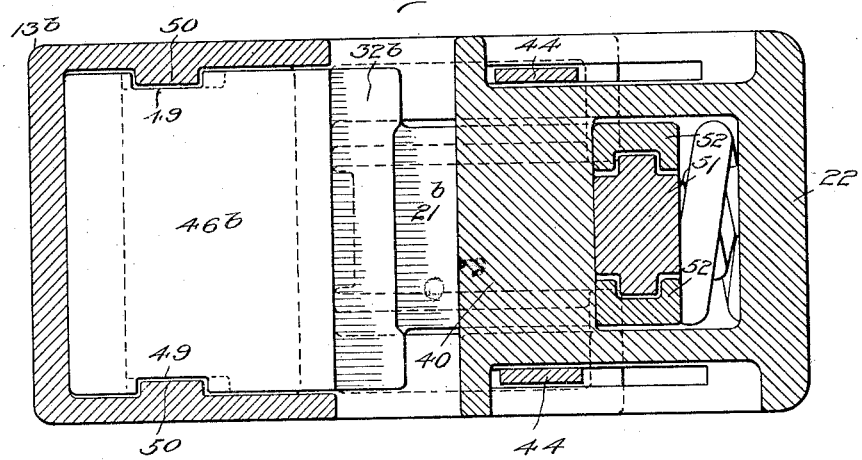
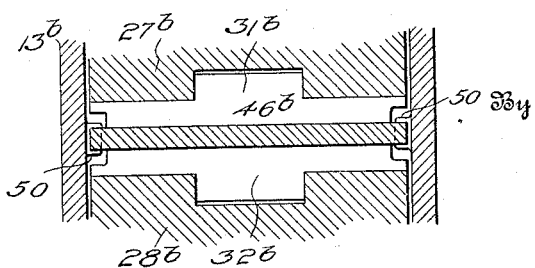
Inventor
Donald S. Barrows
By
his Attorney Patented June 3, 1930

1,761,171

UNITED STATES PATENT OFFICE

DONALD S. BARROWS, OF ROCHESTER, NEW YORK, ASSIGNOR TO THE GOULD COUPLER COMPANY, OF NEW YORK, N. Y., A CORPORATION OF MARYLAND

DRAFT RIGGING

Application filed June 15, 1926. Serial No. 116,186.

This invention relates to railway draft rigging and, more particularly, to a friction shock absorbing mechanism provided with preliminary springs which also serve for releasing the friction mechanism.

The principal object of my invention, generally considered, is to provide a friction draft gear especially adapted for railway cars where relatively low initial resistance is desired combined with high ultimate resistance due to bringing the friction elements of the device into engagement subsequent to the initial compression of the gear.

An object of my invention is to provide a friction draft gear in which a high ultimate cushioning force is provided in a relatively small space without forming a gear unduly stiff at the start by efficiently combining spring and frictional elements in the device.

Another object of my invention is the provision of a friction draft gear provided with a casing having therein laterally movable friction blocks resisted by plate springs and moved by a wedge block formed with an extension toward an associated follower, said follower being spaced from said extension and springs provided between it and the casing and adapted to receive the initial load on the gear and effecting the release of the wedge block.

A further object of my invention is the provision of a friction draft gear provided with preliminary coil springs which receive the initial force on the gear and are compressed during substantially the first half of the gear movement before the friction elements are engaged.

A still further object of my invention is the provision of a friction draft gear formed with a casing and a wedge block extending therein and engaging contained friction elements, the end of said wedge block outside of said casing being provided with a slot interlocking with a bridge or key portion on an associated follower for effecting release of said wedge block when the gear is allowed to expand after application of force thereto.

An additional object of my invention is the provision of a friction draft gear formed with a housing and enclosed friction elements and a follower with release springs extending between said follower and casing, said follower and casing being provided with cooperatively slotted interspaced extensions receiving locking keys therethrough for holding the gear assembled while allowing the desired motion between follower and casing.

A further object of my invention is the provision of a friction draft gear formed with a casing enclosing friction elements and the diaphragm dividing said casing in two compartments, a plurality of wedge blocks extending into said casing on opposite sides of said diaphragm and frictionally engaging both the diaphragm and the friction elements in the casing for increasing the capacity of the gear, said diaphragm being alternatively integral with the casing or separable therefrom.

Other objects and advantages of the invention relating to the particular arrangement and combination of the various parts will become apparent as the description proceeds.

Referring to the drawings illustrating my invention, the scope whereof is defined by the appended claims:

Figure 3 is a transverse sectional view on the line 3—3 of Figure 2 looking in the direction of the arrows.

Figure 4 is a transverse sectional view on the line 4—4 of Figure 2 looking in the direction of the arrows.

Figure 5 is a side elevation of the same form of gear.

Figure 6 is a fragmentary transverse sectional view on the line 6—6 of Figure 2 looking in the direction of the arrows.

Figure 7 is a fragmentary central longitudinal vertical sectional view corresponding to Figure 2 but showing a modification of my invention.

Figure 8 is a sectional view corresponding to Figure 2 with the yoke omitted but showing another modification.

Figure 9 is a horizontal central sectional view on the line 9—9 of Figure 8 looking in the direction of the arrows.

Figure 10 is a fragmentary transverse sectional view on the line 10—10 of Figure 8 looking in the direction of the arrows.

Figure 1:
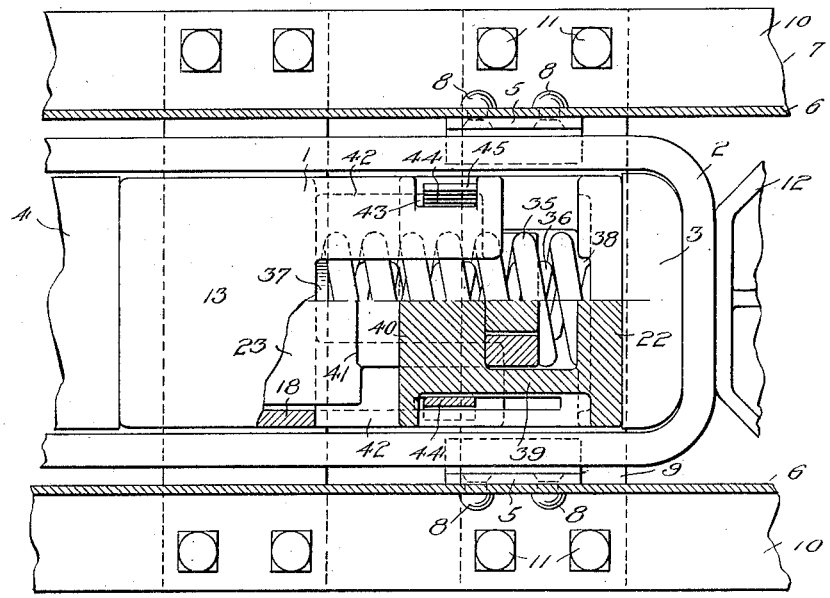
Figure 1 is a plan view partly in section showing one form of my friction draft gear associated with the adjacent portions of the draft rigging and underframe of the car.
Figure 2:
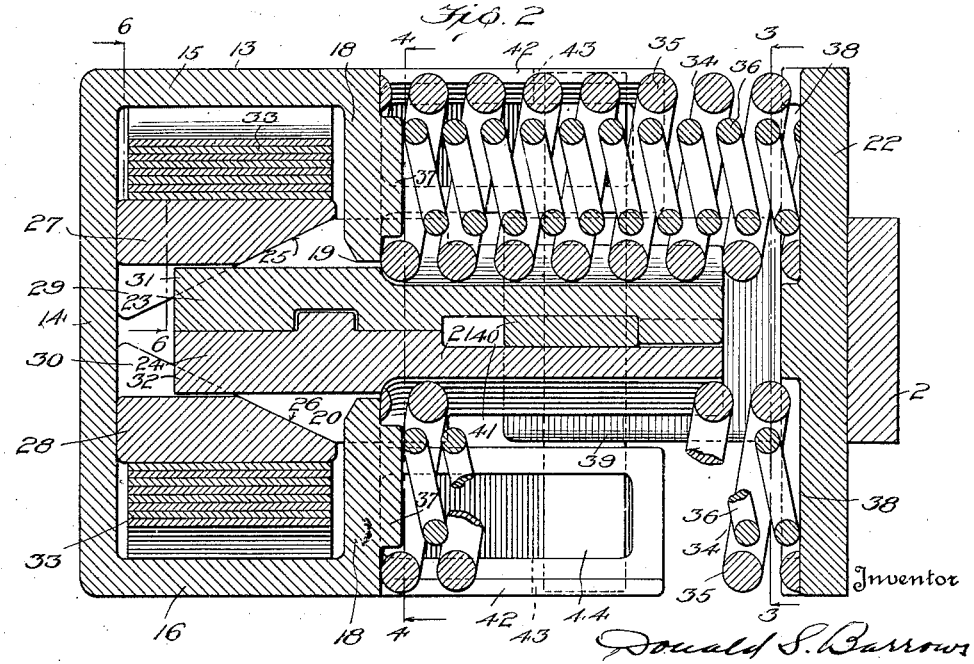
Figure 2 is a vertical longitudinal central sectional view of the same embodiment of my invention.

Referring to the drawings in detail, like parts being designated by like reference characters, and first considering the embodiment of my invention illustrated in Figures 1 to 6, inclusive, one form of my draft gear 1 is shown which may be used with draft rigging in any desired manner, for example, as shown in Figures 1 and 2, with a horizontal yoke 2, a rear follower 3, a front follower 4, said yoke being supported at its rearward portion by angular supporting means 5 connected to the webs 6 of the sills 7 in any desired manner as by means of rivets 8. The gear 1 may be supported between the sills 7 by means of tie plates 9 connected to the lower flanges 10 of the sills 7 in any desired manner as by meants of bolts and nuts 11. The forward portion of the yoke 2 may be connected with a usual form of coupler or other force-transmitting means in the usual manner and the rear or U shaped portion thereof may abut a usual form of stop casting or backstop 12.

The draft gear 1, in the present embodiment, comprises a housing or casing 13 comprising a front wall 14, a top wall 15, a bottom wall 16, side walls 17 and a rear wall 18. The rear wall 18 is formed with an aperture 19 preferably along its intermediate or central portion for receiving the wedge shaped end 20 of a wedge block 21, the opposite end of which extends rearwardly out of the casing 13 toward an associated follower 22. The wedge block 21 is preferably longitudinally divided or formed as a pair of cooperating sections 23 and 24 interlockingly engaged by having cooperating tongues and pockets thereon whereby longitudinal or transverse motion therebetween is prevented but the same may be separated by moving the sections away from each other in a vertical direction.

The wedging or inclined faces 25 and 26 on the wedge block 21 are, respectively, engaged by an upper friction block 27 and a lower friction block 28, said friction blocks interlockingly engaging said wedge block 21 for preventing transverse motion therebetween by the provision of slots 29 and 30 therein into which fit cooperating tongues 31 and 32, respectively, on the sections 23 and 24 of the wedge block 21. Between the square or upper side of the friction block 27 and the adjacent wall 15 of the casing as well as between the square or lower side of the frictional block 28 and the adjacent wall 16 of the casing are preferably positioned a plurality of curved leaf or plate springs 33 which resist the upward and downward transverse movement of the friction blocks 27 and 28 and press the same into frictional engagement with the cooperating surfaces 25 and 26 on the wedge block.

Between the follower 22 and the adjacent wall 18 of the casing 13 extend resilient means 34 which means, in the present instance, comprise vertically spaced twin spring units, each spring unit being formed with an outer coil 35 and an inner coil 36, said outer coils being preferably held in position by engaging bosses 37 on the wall 18 of the housing and extending into socketed or depressed portions 38 in the follower 22. The inner coils 36 are preferably properly located by being wound in a manner opposite to that of the outer coils 35 and surrounded by said outer coils with the necessary clearance therebetween. These springs 34 serve the double function of receiving the initial force on the draft gear and, when said gear is released, of effecting the withdrawal or release of the wedge block 21 from the friction blocks 27 and 28 in a manner to be more fully explained hereinafter.

The drawings show the gear in release position, that is, with the preliminary springs or resilient means 34 expanded to their free height or under a desired amount of initial stress. When in such position, the follower 22 is spaced a predetermined distance from the adjacent end of the wedge block 21, said distance allowing a predetermined compression of said resilient means 34 before the friction mechanism is actuated. In the present instance, this distance through which the springs are compressed before actuating the friction mechanism corresponds to approximately one-half the total gear movement although I do not wish to be limited to such a showing. As shown most clearly in Figures 1, 2 and 3, the follower 22 is formed with arms 39 extending forwardly on opposite sides of the adjacent end of the wedge block 21, said arms being joined by a bridge, web or key portion 40 which extends into a slot 41 formed between the halves of the wedge block 21 for limiting the relative motion between the follower and wedge block. The slot 41 is of a length greater than the corresponding dimension of the bridge portion 40 of the follower 22 an amount equal to the lost motion or normal distance between the end of the wedge block and the main portion of the follower 22 so that said bridge portion 40 slides in the slot 41 until the follower 22 abuts against the end of the wedge block 21 and forces said wedge block into the casing 13 to expand the friction mechanism therein. Upon release of the gear, the follower 22 may move from the casing 13 an amount equal to the lost motion between the bridge 40 and the slot 41 when said bridge engages the outer end of the slotted portion of the wedge block 21 and withdraws said wedge block from the casing 13 even though the angular disposition of the friction surfaces 25 and 26 and the strength of the plate springs 33 are insufficient for accomplishing such a result.

For preventing the undesired complete disengagement of the follower 22 from the casing 13, said casing is preferably formed with a plurality of U-shaped portions 42 extending toward the follower 22 but leaving a distance between the ends thereof and said follower corresponding to a maximum gear travel. Between these extensions 42 extend the arms 39 of the follower 22, said extensions 42 and arms 39 being formed with registering slots 43 receiving keys 44 for preventing the withdrawal of the follower 22 from the casing 13 further than shown in Figure 2, said slots 43 and keys 44 being proportioned for that purpose to allow lost motion between the follower 22 and the casing 13 corresponding to the maximum permissible gear movement or compression. The ends of the keys 44 may be bent at 45, as shown particularly in Figure 3, to prevent undesired withdrawal thereof thereby retaining the casing 13 and follower 22 in locked relation while allowing the desired amount of motion therebetween.

Referring now to the modification of my invention illustrated in Figure 7, a construction substantially identical with that shown in Figures 1 to 6, inclusive, is illustrated except that the casing 13$^a$ is formed with an integral bridge or diaphragm 46 dividing the same into upper and lower compartments 47 and 48. The upper portion 31$^a$ of the wedge block 21$^a$ extends above the diaphragm 46 and frictionally engages the same as well as the associated friction block 27$^a$ spring pressed thereagainst by springs 33$^a$. In a similar manner, the lower half 32$^a$ of the wedge block 21$^a$ extends below the diaphragm 46 and frictionally engages the lower surface thereof as well as its associated friction block 28 spring pressed thereagainst by associated plate springs 33$^a$. The clearance between the parts 31$^a$ and 32$^a$ of the wedge block 21$^a$ is such that the maximum pressure between the same and the diaphragm 46 is obtained thereby securing a maximum increase in frictional capacity of the gear by the employment of the diaphragm 46. Except as specifically described, the remainder of the gear may be as disclosed in connection with Figures 1 to 6, inclusive.

Referring now to the embodiment of my invention illustrated in Figures 8, 9 and 10, a very similar construction is disclosed except that the diaphragm 46$^b$, instead of being integral with the casing 13$^b$, is separable therefrom and held in place by having notched portions 49 therein engaged by correspondingly formed bosses 50 on the interior of the casing 13$^b$. The diaphragm 46$^b$ may be placed in position after the plate springs 33$^b$ and friction blocks 27$^b$ and 28$^b$ are properly positioned by being initially placed above or below the bosses 50 and then moved until the notches 49 thereof engage said bosses after which the parts 31$^b$ and 32$^b$ of the wedge block 21$^b$ may be positioned therearound. The wedge block 21$^b$ although constructed substantially as shown in Figure 7 is, on account of the greater length of the diaphragm 46$^b$, formed without the boss and groove connection adjacent the wedge shaped end of said member so that the corresponding connection at the other end is preferably formed as particularly illustrated in Figure 9, that is, a star or + shaped portion 51 of one of the parts of the wedge block 21$^b$ engages in a correspondingly socketed portion 52 in the other part of said wedge block. Except as heretofore specifically described, this additional modification may be constructed substantially identical with that shown in Figures 1 to 6, inclusive.

Although I have shown my draft gear as vertically disposed and used with a horizontal yoke, yet it is obvious that I do not wish to be restricted to such a showing as, if desired, the gear may be horizontally disposed, that is, positioned with the springs arranged laterally of one another rather than positioned one above the other. It is also obvious that my gear may be used with other forms of yokes, for example, with yokes of the vertical type. Although the gear is shown as disposed with its casing end forward of the car, yet, if desired, the same may be disposed advantageously with the casing end inward of the car in which position said casing would serve as a rear follower and the rear follower would function as a front follower or be abutted by a front follower. When buffing forces are applied to the car and, more particularly, to the coupler thereof, the same are transmitted through the front follower 4 to directly compress said gear against the U shaped portion of the yoke 2 which is held against movement by engagement with the backstop 12. When draft forces are applied, the yoke 2 is pulled forwardly to compress the gear against the front follower 4 which may be held in proper position in the usual manner. Although the wedge block is shown preferably formed in two parts, it is obvious that I do not wish to be restricted to such a showing as the same may be formed as a single integral member and the bridge or key portion 40 of the rear follower 22 may be made removable for the desired connection with said wedge block.

Having now described my invention, I claim:

1. In a draft gear, in combination, a housing, a wedge block movable inwardly of said housing, friction blocks movable laterally in said housing by said wedge block, springs in said housing laterally compressible by said friction blocks, a follower, and other springs longitudinally positioned between said housing and follower, disposed on either side of said wedge block, and compressible a predetermined amount before the follower engages said wedge block.

2. In a draft gear, in combination, a housing, friction resistance mechanism located in said housing and comprising laterally compressible springs engaged by laterally movable friction blocks, a wedge block movable inwardly of said housing and engaging said friction blocks to move the same laterally against said springs, a follower, longitudinally extending springs between said follower and the adjacent wall of said housing and an extension on said wedge block engaged by said follower only after a predetermined compression of said longitudinally extending springs.

3. In a draft gear, in combination, a housing, a plurality of plate springs enclosed in said housing, friction blocks engaging said plate springs for flexing the same laterally of the mechanism, a wedge block engaging said friction blocks and adapted for movement inwardly of the housing to move said friction blocks laterally away from each other into engagement with said plate springs, a follower longitudinally disposed with respect to said housing and spaced therefrom at the end thereof receiving the wedge block, the walls of the housing extending inwardly to embrace the wedge block, and coil springs positioned between said walls and the follower and adapted to be compressed initially to a predetermined degree before said follower engages the wedge block to move the same inwardly of the housing.

4. In a draft gear, in combination, a movable housing, a wedge block relatively movable into said housing, friction blocks laterally movable in said housing by engagement of the wedge block therewith, springs in said housing resisting the movement of said friction blocks, a follower and twin springs arranged between said housing and follower and adapted to be directly compressed therebetween by movement of either of said parts toward the other.

5. In a draft gear, in combination, a housing, frictional resistance mechanism located in said housing and comprising springs adapted for compression by laterally movable friction blocks, an intermediate wedge block frictionally engaging said friction blocks and moving the same laterally against said springs, a follower, longitudinally extending springs between said follower and the adjacent walls of the housing which form pockets receiving said friction blocks, and an extension on said wedge block engaged by said follower after the longitudinally extending springs have been compressed during the first half of the gear travel.

6. In a draft gear, in combination, a housing, a plurality of plate springs enclosed in said housing, friction blocks engaging said plate springs for flexing the same laterally, a wedge block extending between said friction blocks and adapted for movement longitudinally in the housing to force the friction blocks laterally away from each other to engage with said plate springs, a follower longitudinally disposed with respect to said housing and spaced from the end of the wedge block a distance corresponding to about one-half the normal gear movement, the walls of the housing extending inwardly to surround the wedge block and enclose the plate springs, and coil springs positioned between and engaging said walls and the follower and adapted to be initially compressed a predetermined amount before the follower engages the wedge block to move the same inwardly of the housing.

7. In a draft gear, in combination, a housing, a wedge block movable inwardly of said housing, friction blocks movable laterally in said housing by said wedge block, springs in said housing opposing the movement of said friction blocks, a follower formed with a transverse bridge portion slidably interlocking with that portion of the wedge block adjacent said follower and release springs longitudinally positioned between said housing and follower and serving for taking the initial force applied to the gear and for releasing the wedge block from the friction blocks through the engagement of the brief portion of said follower with said wedge block.

8. In a draft gear, in combination, a housing, frictional resistance mechanism located in said housing and comprising laterally compressible springs engaged by laterally movable friction blocks, a wedge block movable inwardly of said housing and engaging said friction blocks to move the same laterally against said springs, a portion of said wedge block extending longitudinally away from said housing, a follower, a bridge portion on said follower slidably interlocking with the extension on said wedge block, longitudinally extending springs between said follower and the adjacent wall of said housing and adapted to take the initial load on the gear and release the wedge block from the friction blocks through the engagement of the follower bridge and wedge block extension upon release of the gear.

9. In a draft gear, in combination, a housing, a plurality of plate springs enclosed in said housing, friction blocks engaging said plate, springs for flexing the same laterally, a wedge block engaging said friction blocks and adapted for movement inwardly of the housing to move said friction blocks laterally from each other against said plate springs, a follower longitudinally spaced from said housing, the walls of the housing extending inwardly and surrounding the wedge block, said follower and wedge block being formed with a lost motion connection and coil springs positioned between the follower and adjacent walls of the housing, adapted to be compressed initially to a predetermined degree before the follower engages the wedge block to move the same inwardly of the housing and serving to release said wedge block from the friction blocks through the lost motion connection between the follower and wedge block upon release of the gear.

10. In a draft gear, in combination, a housing, a wedge block movable inwardly of said housing, friction blocks movable laterally in said housing by said wedge block, springs in said housing laterally acting on said friction blocks, a follower, and a lost motion connection between said follower and housing allowing a desired amount of movement between said parts but preventing undesired complete disengagement thereof.

11. In a draft gear, in combination, a housing, frictional resistance mechanism located in said housing and comprising laterally compressible springs engaged by laterally movable friction blocks, a wedge block movable inwardly of said housing and engaging said friction blocks to move the same against said springs, a follower, certain of the walls of said housing being extended toward the follower and complementary extensions provided on said follower between pairs of said housing extensions, and keys extending through slots in the corresponding walls of the housing and follower for preventing entire disconnection thereof while permitting the desired relative motion therebetween.

12. In a draft gear, in combination, a housing, a plurality of plate springs enclosed in said housing, friction blocks engaging said plate springs for flexing the same laterally of the mechanism, a wedge block engaging said friction blocks and adapted for movement inwardly of the housing to force the friction blocks away from each other into engagement with said plate springs, a follower spaced longitudinally from the end of the housing receiving the wedge block, said follower and housing being formed with alternately interspaced walls extending from one toward the other and slotted, connecting keys extending through said slots and said slots and keys being so proportioned that the desired amount of motion between said housing and follower is permitted while said parts are prevented from entire disengagement, and coil springs positioned between said follower and housing for receiving the initial load on the gear before engagement is effected between the follower and wedge block.

13. In a draft gear, in combination, a housing, a wedge block movable inwardly of said housing and formed as two parts interlockingly engaged, friction blocks movable laterally in said housing by said wedge block, springs in said housing acting laterally on said friction blocks, a follower formed with portions extending on either side of said wedge block, a bridge portion extending between the parts of the wedge block and slidably engaged therewith for allowing a desired amount of motion therebetween, and springs longitudinally positioned between said housing and follower for releasing said wedge block from the friction blocks upon release of the gear.

14. In a draft gear, in combination, a housing, an intermediate diaphragm in said housing dividing the same into two laterally spaced compartments, a wedge block movable inwardly of said housing on either side of said diaphragm frictionally engaging the same, a friction block movable laterally in said housing by each wedge block, springs in said housing acting laterally on said friction blocks, a follower, and longitudinally extending springs between said housing and follower for effecting release of the gear.

15. In a draft gear, in combination, a housing, frictional resistance mechanism located in said housing and comprising laterally compressible springs engaged by laterally movable friction blocks, a diaphragm longitudinally disposed in said housing and dividing the same into two laterally arranged compartments, a wedge block movable inwardly of said housing on each side of said diaphragm and engaging the respective friction block to move the same laterally against said springs, a follower, longitudinally extending springs between said follower and the adjacent wall of said housing and extensions on said wedge blocks engaged by said follower only after a predetermined compression of said longitudinally extending springs.

16. In a draft gear, in combination, a housing, a longitudinally extending diaphragm dividing said housing into compartments, a plurality of plate springs enclosed in each compartment, a friction block in each compartment engaging the respective springs for flexing the same laterally, a wedge block on either side of said diaphragm engaging the respective friction block and adapted for movement inwardly of the housing to move the friction blocks laterally from each other to stress said plate springs, a follower longitudinally spaced with respect to said housing, the walls of the housing surrounding said wedge blocks where the same are extended outwardly toward the follower and coil springs positioned between said walls and the follower and adapted to be compressed initially to a predetermined degree before said follower engages the wedge blocks to move them inwardly of the housing.

In testimony whereof I affix my signature.

DONALD S. BARROWS.